United States Patent [19]
Cho

[11] Patent Number: 5,375,249
[45] Date of Patent: Dec. 20, 1994

[54] EIGHT-TO-FOURTEEN-MODULATION CIRCUIT FOR A DIGITAL AUDIO DISC SYSTEM

[75] Invention: Heon-cheol Cho, Seoul, Rep. of Korea

[73] Assignee: SamSung Electronics Co., Ltd., Suwon, Republic of Korea

[21] Appl. No.: 635,440

[22] Filed: Dec. 28, 1990

[30] Foreign Application Priority Data

Dec. 29, 1989 [KR] Rep. of Korea ............... 89-20092

[51] Int. Cl.$^5$ ............................................. G06F 5/00
[52] U.S. Cl. ............................. 395/800; 364/259.8; 364/260.6; 364/260.1; 364/258.1; 364/DIG. 1; 369/59
[58] Field of Search ............ 395/250, 800; 369/59; 341/59, 67

[56] References Cited

U.S. PATENT DOCUMENTS

| | | | |
|---|---|---|---|
| 4,501,000 | 2/1985 | Immink | 375/25 |
| 4,520,346 | 5/1985 | Shimada | 341/58 |
| 4,603,413 | 7/1986 | Sinjou | 369/59 |
| 4,853,920 | 8/1989 | Hoysoya | 369/59 |
| 5,077,721 | 12/1991 | Sako | 360/59 |
| 5,122,912 | 6/1992 | Kanota | 360/46 |

*Primary Examiner*—Eric Coleman
*Agent, Attorney or Firm*—Robert E. Bushnell

[57] ABSTRACT

The Eight-to-Fourteen-Modulation (EFM) circuit for a digital audio disc system. The circuit stores in a separate memory the numbers of leading and trailing zeros, and the code sum values and the inverting informations for each channel bit data with the merge bit data corresponding to 8-bit symbol data. The circuit sequentially reads the informations of the memory and compares the informations for four merge bits, thereby rapidly selecting an optimum merge bit to satisfy the run length restriction and the minimum direct current requirement.

Therefore, the circuit enables a real time process of the EFM conversion, a miniaturization and economization of the system due to the reduction of the number of the hardware.

16 Claims, 11 Drawing Sheets

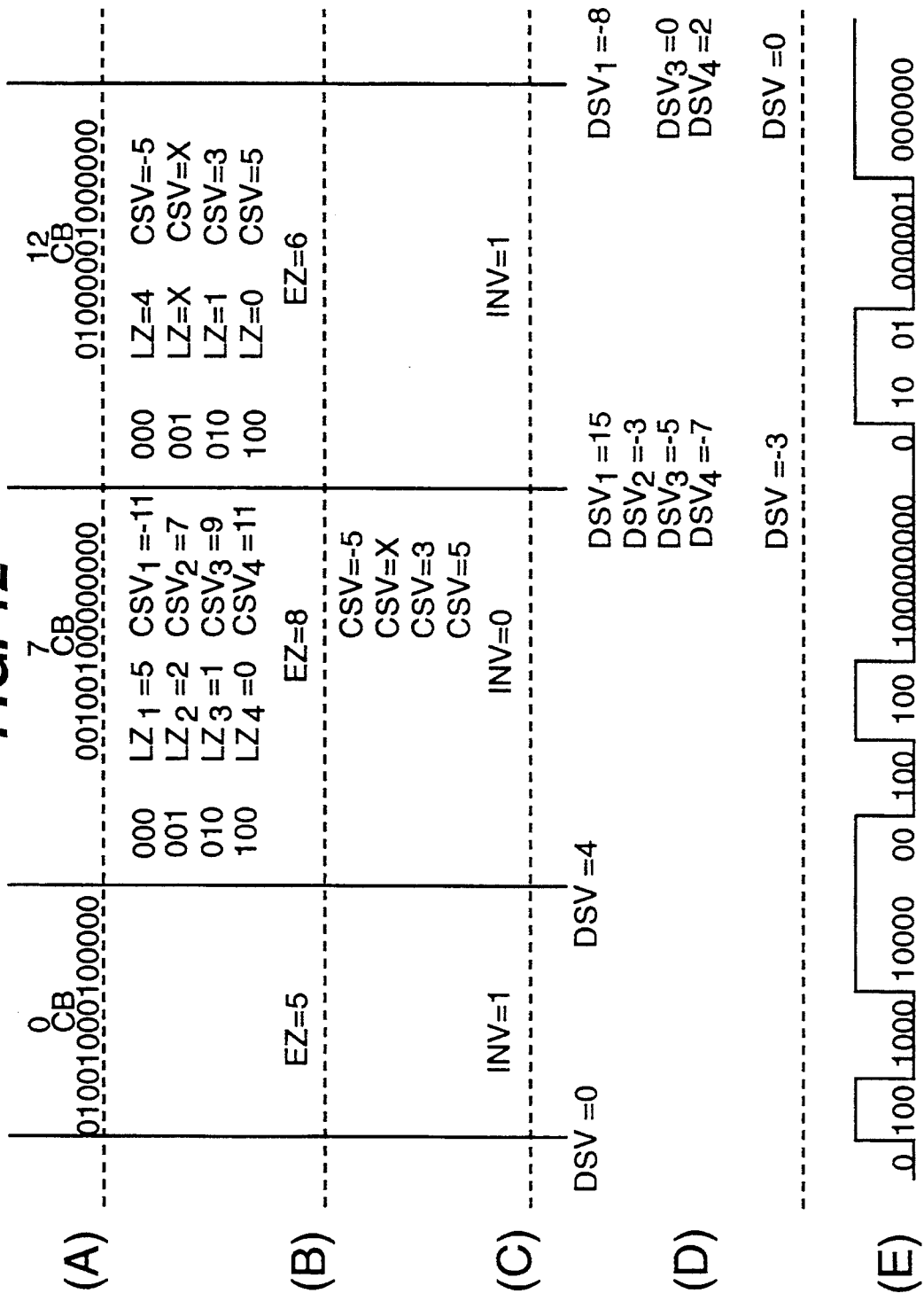

EIGHT-TO-FOURTEEN-MODULATION CIRCUIT FOR A DIGITAL AUDIO DISC SYSTEM

BACKGROUND OF THE INVENTION

The present invention relates to an Eight-to-Fourteen-Modulation(EFM) circuit for a Digital Audio Disc(DAD) system, particularly to a EFM circuit for a DAD system using a compact disk on which a predetermined information is recorded.

In a conventional Compact Disc(CD) type DAD system, an audio signal is sampled and quantitized to be encoded to 16 bit digital data. The 16 bit digital data is termed 1 word or 1 sample. The data of 1 sample, in turn, is divided into two symbols, each of which being composed of 8 bits for the convenience of signal processing such as an error correction, and the data is processed by the unit of the symbol.

The symbol data is a 2 bit signal consisting of "0" and "1", and is converted into a Non-Return-to-Zero-and-Invert(NRZI) signal, or a pit record signal, then it is recorded on the CD as a pit train.

The pit record signal on the CD is reproduced by a DAD reproduction system with a optical pick-up apparatus. When the 8 bit symbol signal is directly recorded on the CD, there arise a number of problems in reproducing.

That is, if the pit train frequently alternates, for example, if the pit train alternates by a transition length corresponding to the data length of 1 bit, it will reduce the spacing between pits. It accordingly shortens the available record time, and deteriorates reproduction audio quality due to an interference between adjacent pits.

To achieve a stable reproduction of signals, the length of each pit, and the spacing between pits, namely a run length is preferably set to a value longer than a certain minimum.

In a CD type DAD system, the minimum of the run length is prescribed as 3T, where 1T is a pit length corresponding to a data length of 1 bit.

The pit length may be taken as a physical length of the pit recorded on the CD, or a corresponding pulse width of a NRZI converted signal.

On the contrary, when the run length is lengthened excessively, a stable reproduction of a reference clock train is impossible. Moreover, a tracking is not executed normally by the large difference between reproduced signals of adjacent tracks. Therefore, the maximum of the run length is preferably set within a predetermined value, the maximum is prescribed as 11T in a CD system.

To make the NRZI converted pit record signal satisfy the above described restrictions of the run length, 8 bit symbol signal is converted into 14 bit one in a CD system.

The conversion is generally called 8-14 bit modulation, or EFM(Eight-to-Fourteen-Modulation). In the EFM procedure, the number of combinations of 8 bit signal is 256, and that of 16 bit signal is 16,384, thus these combinations are not correspond to each other.

Therefore, of the 14 bit combinations of 16,384, only the combinations which satisfy the restriction of run length between 3T and 11T, are selected and matched with the 8 bit combinations. In more detail, there are 267 combinations of 14 bit signals which comprise 2-10 "0" between "1" and "1" inverting the signal pulse, and only 256 combinations of 267 are corresponded to 8 bit signal combinations. In general, the 8-14 bit conversion table, i.e. an EFM table is stored in a Read-Only-Memory(ROM). The ROM'S are respectively provided for DAD record and reproduction systems, and used for signal convertings. The symbol signal converted to 14 bit as described above, is called as a channel bit signal.

But when the channel bit signal is NRZI converted to be directly recorded on a CD, it cannot satisfy the run length restrictions either. For example, data "48" corresponds to a channel bit "00000100000000", and "173" to "00000001001001" in the above described EFM table. Accordingly, if the data "173" follows data "48", fifteen "0" are included between "1" and "1". The result is that the run length of NRZI converted pit record signal becomes 16T, thus not satisfy the restriction, below 11T.

To solve the problem, a merge bit is inserted between respective channel bit symbols to satisfy the run length restriction.

A standard CD system uses four kinds of 3 bit signals such as "000", "001", "010", "100", as the merge bit. The merge bit signal will be skipped by a decoder not to be included in a reproduced audio signal in a reproducing procedure.

More than two out of the four kinds of merge bit may satisfy the run length restrictions. In this case, it will be preferably selected a merge bit which minimizes the direct current component of the reproduced signals. It is used for preventing the bias of an optical pick-up apparatus to ensure a stable tracking, and for reducing the low band components to lighten the effect of a local damage of the CD on the reproduced signals. To achieve it, a merge is selected which draws a Digital Sum Value or Digital Sum Variation (DSV) nearest to "0", where the DSV means a total digital sum when +1 is allocated for a "high(1)" region of the pit record signal or the reproduced signal, and −1 for a "low(0)" region.

In a conventional CD system, channel signals to be EFM converted as above, are processed respective 6 samples of right and left channels, that is 24 symbols of data as 1 frame.

There is shown a data format of 1 frame in FIG. 1. In the drawing, data of 24 symbols is divided into a pair of 12 symbols, and 4 symbols of parity signals, each of which is provided with Error Correction Codes(ECC).

And, to the front of the frame, there are attached a 24 bit synchronizing symbol for the frame synchronization and a subcoding symbol for control and display, thus 1 frame consists of 34 symbols, 588 bit in total.

In FIG. 2, there is shown a conventional CD recording system which encodes an audio signal train into a frame signal having the format shown in FIG. 1. Analog audio signals are generated from audio sources of R and L channels, then fed to filters.

The high frequency noise components of the signal are eliminated by the R and L channel low pass filters 1 and 2, then, the resultant signals are respectively sampled by a sampling frequency of 44.1 KHz at R and L channel samplers 3 and 4.

Sampled signals of each channel are respectively fed to the R and L channel Analog/Digital (A/D) converters 5 and 6, and are quantitized and encoded to be converted into 16 bit digital data per 1 sampling period. As the sampling frequency is 44.1 KHz, the sampling speed is 44.1 sample/sec, and the encoding speed is 88.2K symbol/sec as 1 sample corresponds to 2 symbol.

The first multiplexer 7 alternately selects the encoded 16 bit digital data of two channels, thus serially arranges signals of two channels to output data of 24 symbols.

The speed of the Parallel Input Serial Out (PISO) will be 176.4K symbol /see, since two input have the encoding speed of 88.2K symbol/sec, respectively.

The PISO converted data are fed to an ECC encoder 8, and thereat 4 symbols of parity signals per 12 data symbols are attached to them as error correction codes. Then the encoder generates 24 data symbols and 8 parity symbols. Meanwhile, a subcoding encoder 9 generates a subcoding symbol of 8 bit on which control data such as control or display signals are recorded.

The subcoding symbol is fed to the second multiplexer 12 and combined with the data symbols and parity symbols from the ECC encoder 8. As the combined data consists of 1 subcoding symbol, 24 data symbols, 8 parity symbols, thus 33 symbols in total, the combining speed becomes $176.4\times(32/24)=242.55K$ symbol/sec.

The combined signal is fed to EFM modulator 10 and converted into 14 channel bit data, being inserted by appropriate merge bits.

Then a synchronization pattern of 24 bit generated by a synchronization generator 11 is attached to the front of the converted signal frame, thus an EFM modulated frame having a format shown in FIG. 1 is formed.

The frequency of the frame signal will be 7.35 KHz. Here, 1 frame consists of 588 bits, so that the reference clock should have a frequency of 7.35 KHz$\times$588=4.3218 MHz.

Meanwhile, 98 frames of signals form a block of signals. To synchronize each blocks, the subcoding encoder 9 generates a block synchronization signal of two 14 channel bit symbols every 98 frames, that is a frequency of 75 Hz. Numeral 13 is a timing signal generator for feeding reference clocks to each parts of the system.

Thus, formatted frame signal is converted into a pit record signal train having a NRZI wave form inverted by "1" as an inverting signal, and recorded on a CD not shown as pits.

Though it is not available for a written matter, conventional modulation circuits for the above described EFM conversion have complicated structures and have no compatibility with other systems. And they can not execute the check of the run length and the selection of the merge bit at the same time, thus lengthen the processing time.

Moreover, since the overall equilibrium of the reproduced signal train is not considered in the selection of the merge bit, a stable reproduction of a tracking can not be achieved.

SUMMARY OF THE INVENTIONS

Therefore, it is an object of the present invention to provide an EFM modulator for a DAD system having a simple structure and accordingly capable of miniaturization, high-speed operation and a stable reproduction.

To achieve these and other objects, eight-to-Fourteen-Modulation circuit for a digital audio system, for converting a symbol data of 8 bit to a channel bit data of 14 bit, according to the present invention comprises:

a memory means for storing and outputting said channel bit data corresponding to said symbol data;

another memory means for storing and outputting informations in a plurality of registers, each of said registers having said informations for a data bit which is formed by combining said channel bit and anyone of four kinds of merge bits, and said informations including said merge bit, numbers of zero included in front and end of said data bit, a code sum value of said data bit and an inverting signal;

a merge bit generator for receiving said channel bit data fed from said memory means and said information of said register fed from said another memory means, and generating a selection signal for an optimum merge bit to feed said another memory means, said optimum merge bit combined with said channel bit data fulfilling a predetermined run length restriction and minimizing a direct current component;

a Parallel-Input-Serial-Out(PISO) converter for parallely loading said channel bit data fed from said memory means as an upper bit and said merge bit fed from said another memory means as a lower bit, and serially outputting said channel bit and said merge bit on selecting said optimum merge bit;

a Non-Return-to-Zero-and inverting (NRZI) converter for receiving output Of said PISO converter and NRZI converting said output to form a pit record signal train.

According to the present invention, a simple and universal EFM modulating circuit capable of selection of merge bit which ensures a stable reproduction and a rapid signal conversion, is provide.

BRIEF DESCRIPTION OF THE DRAWINGS

The object and other features of the present invention will be more apparent by the following detailed description with reference to accompanied drawings, in which:

FIG. 12 is a view for illustraing the EFM modulating procedures according to the present invention.

DETAILED DESCRIPTION

Figure 1:
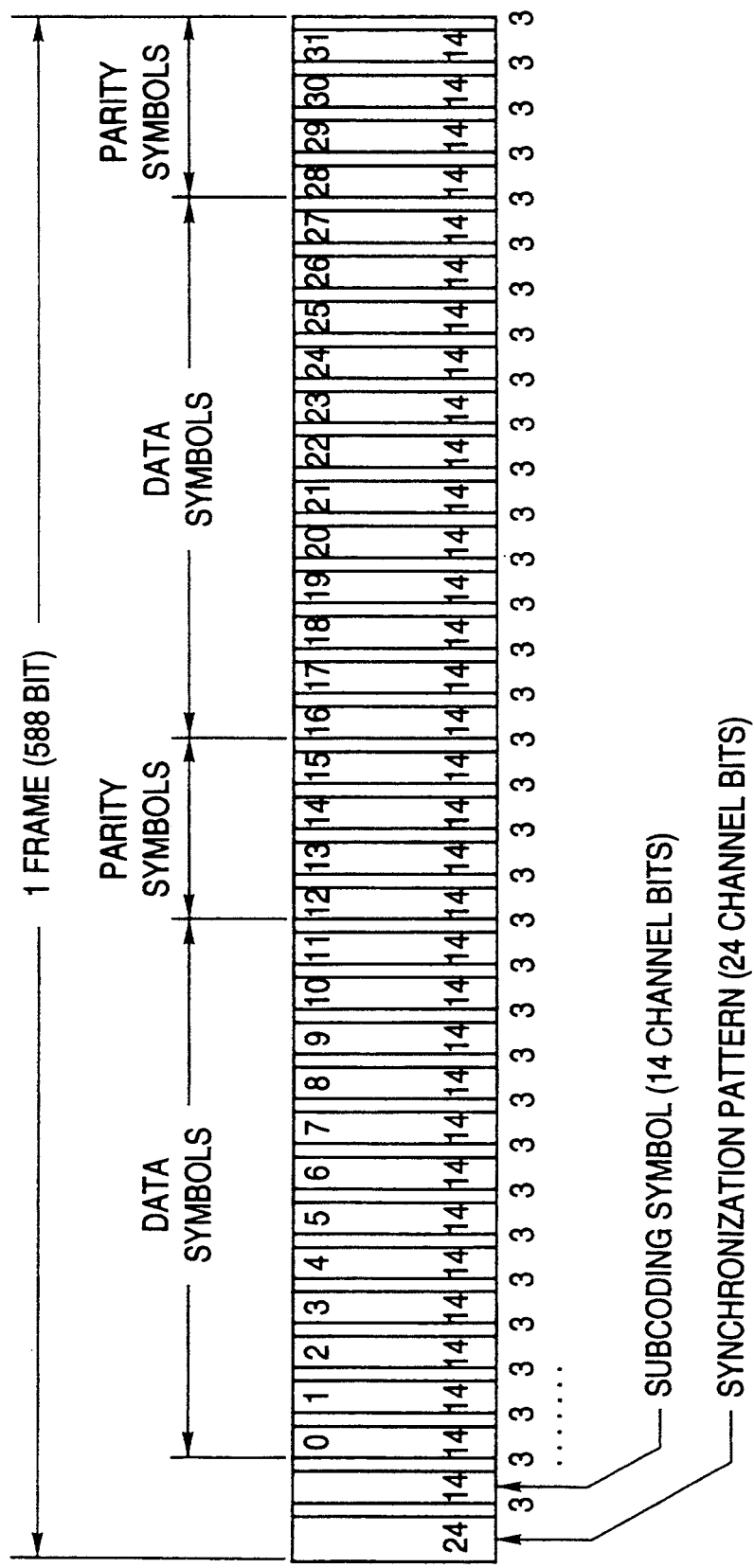
FIG. 1 is a map showing a conventional format of a frame data to be recorded on the CD.
Figure 2:
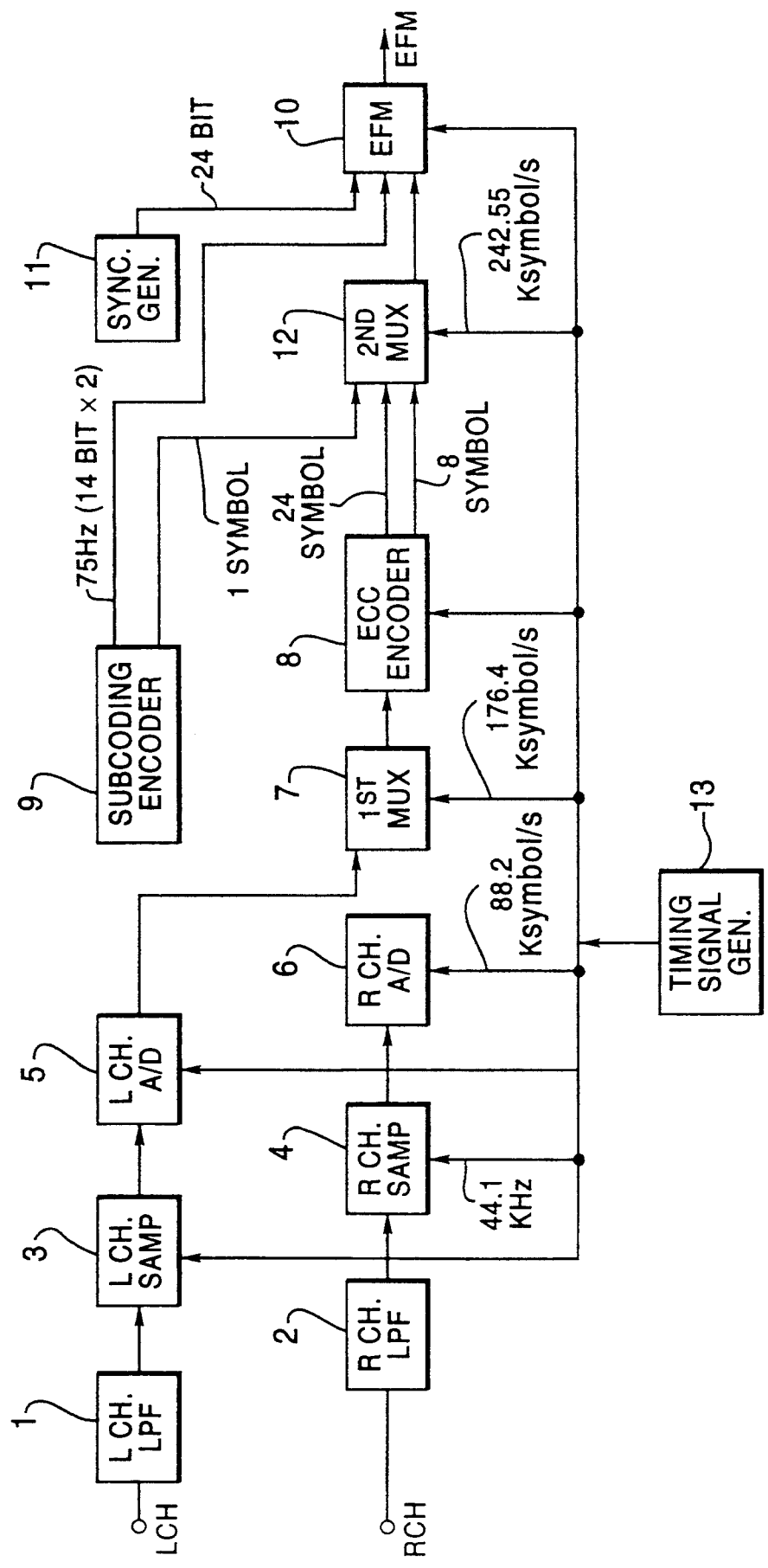
FIG. 2 is a block diagram showing an encoding apparature of a conventional CD system.
Figure 3:
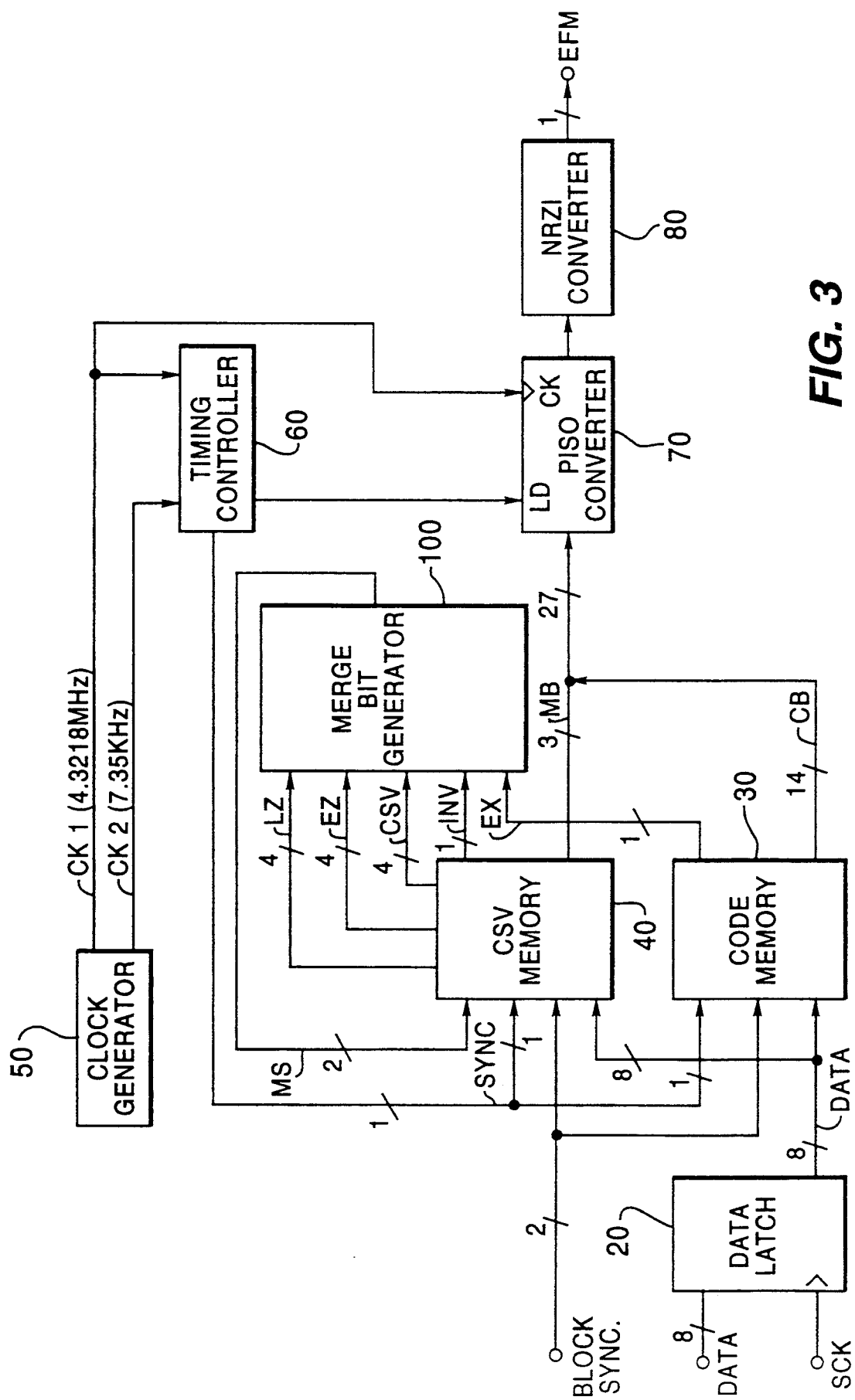
FIG. 3 is a block diagram showing an EFM modulating circuit according to the present invention.

Referring to FIG. 3, a data latch 20 temporarily stores 8 bit symbol data DATA fed from an unshown encoding apparatus, and outputs them by a symbol clock SCK.

Using the latched symbol data of 8 bit as the first address, a code memory 30 generates corresponding channel bit CB of 14 bit and exception signal EX.

Using the same latched 8 bit symbol data as the first address and a merge selection signal Ms, which will be described later, as the second address, a CSV memory 40 generates a lead zero number LZ, an end zero number EZ, CSV and an inverting signal INV corresponding to the symbol in series, and produces a merge bit MB when a final second address is fed.

A merge bit generator 100 checks the run length of the corresponding merge bit and channel bit and counts the digital sum value DSV based on the informations LZ,EZ,CSV,INV and EX.

When a optimum merge bit is selected, the generator 100 generates the merge selection signal MS and feeds it to the CSV memory 40 as the final second address.

A clock generator 50 generates the first clock CK1 for the PISO conversion and the second clock CK2 for dividing the frame.

A timing controller 60 divides the second clock CK2 by 17 for the data and parity symbols and by 27 for the synchronization pattern symbol, thus generates the first and second divided signals.

According to the first or the second divided signals, a PISO converter 70 parallelly loads the merge bit MB from the CVS memory 40 as an upper bit, and the channel bit signals CB from the code memory 30 as a lower bit, then serially produces outputs by the first clock CK1.

An NRZI converter 80 converts the output of the PISO converter 70 into an NRZI signal train, then generates a final pit record signal train.

Figure 4:
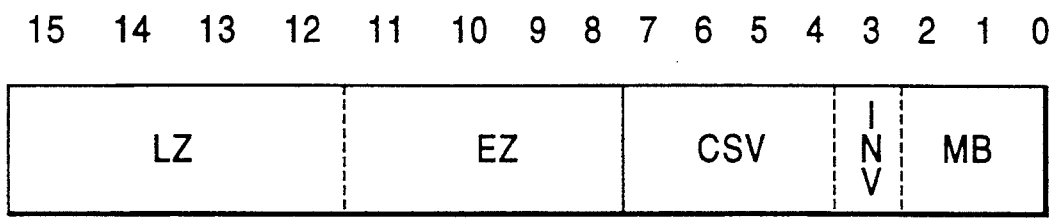
FIG. 4 ia a map showing an example of a register format in the CSV memory shown in FIG. 3.

Referring to FIG. 4, there is shown a format of the conversion table stored in the CSV memory 40 shown in FIG. 3, namely, orders of registers for the informations corresponding to each merge bits. For example, a lead zero number LZ is stored in an upper nibble of the upper bit, and an end zero number EZ in lower nibble. And an inverting bit INV of 1 bit and a merge bit MB of 3 bit are stored in a lower nibble of the lower bit, and a CSV value CSV in upper nibble.

Figure 5:
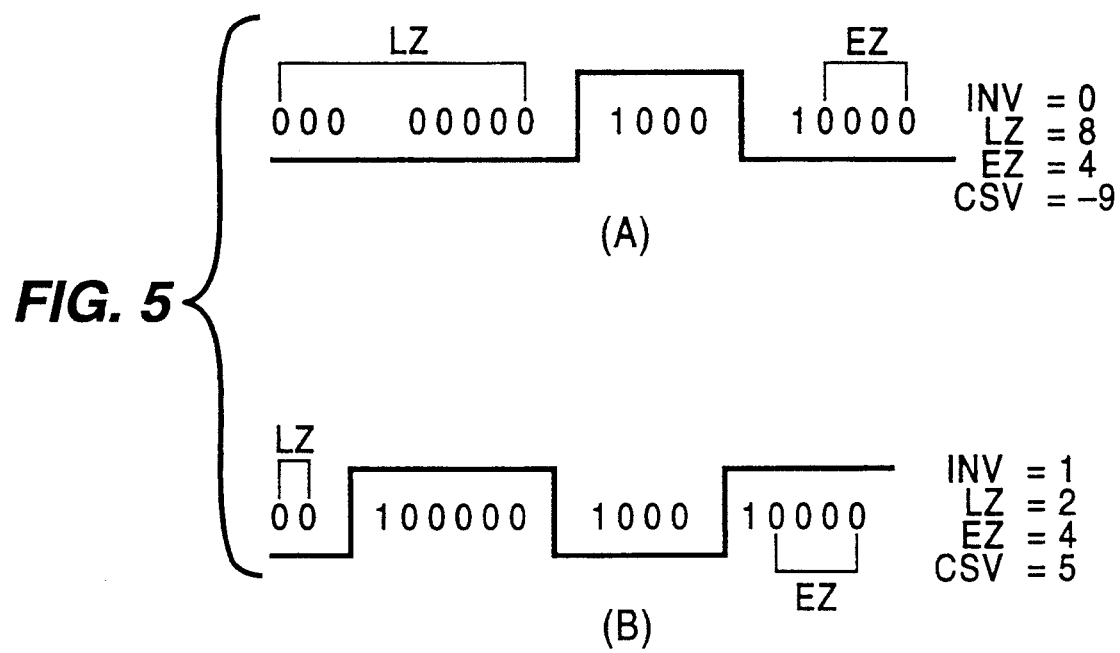
FIG. 5 is a diagram for illustrating the formatted data shown in FIG. 4.

In FIG. 5, there is shown two examples (A) and (B) For illustrating the contents of the informations stored in the CSV memory 40. If the lead and end zero numbers LZ and EZ are respectively composed of 4 bit, for example, and the CSV 5 bit including the sign bit, the inverting bit 1 bit, the merge bit 3 bits, and register of the CSV memory 40 should be constituted in 17 bits in total.

As a conventional memory device is composed of 8 bit units, it will be preferable to convert the CSV value through 2's complemental conversion, namely (CSV−1)/2, to be 4 bits including the signal bit.

Then, the CVS memory 40 will be embodied in 16 bits. In the case (A) of FIG. 5, when the data is "5" and the merge bit is "000", the merge channel bit will be "000"+"00000100010000". Therefore, the lead zero number LZ becomes "8", the end zero number EZ "4", the CSV "−9" and the inverting bit "0". Where, the CSV corresponds to the difference of "HIGH" regions and "LOW" regions in the NRZI converted signals, 4T−13T=−9T, thus becomes "−9" for the case, and is stored after complemental converted.

Therefore, the values stored in the CSV memory 40 will be "84", "complement of −9".

In the case(B) of FIG. 5, when the data is "5" and the merge bit "001", then follows "001"+"00000100010000". Thus the lead zero number LZ becomes 2, the end zero number EZ "4", the CSV "5" (11T−6T=5T), the inventing bit "1". According it will be recorded as "24", "complement of 5".

Figure 6:
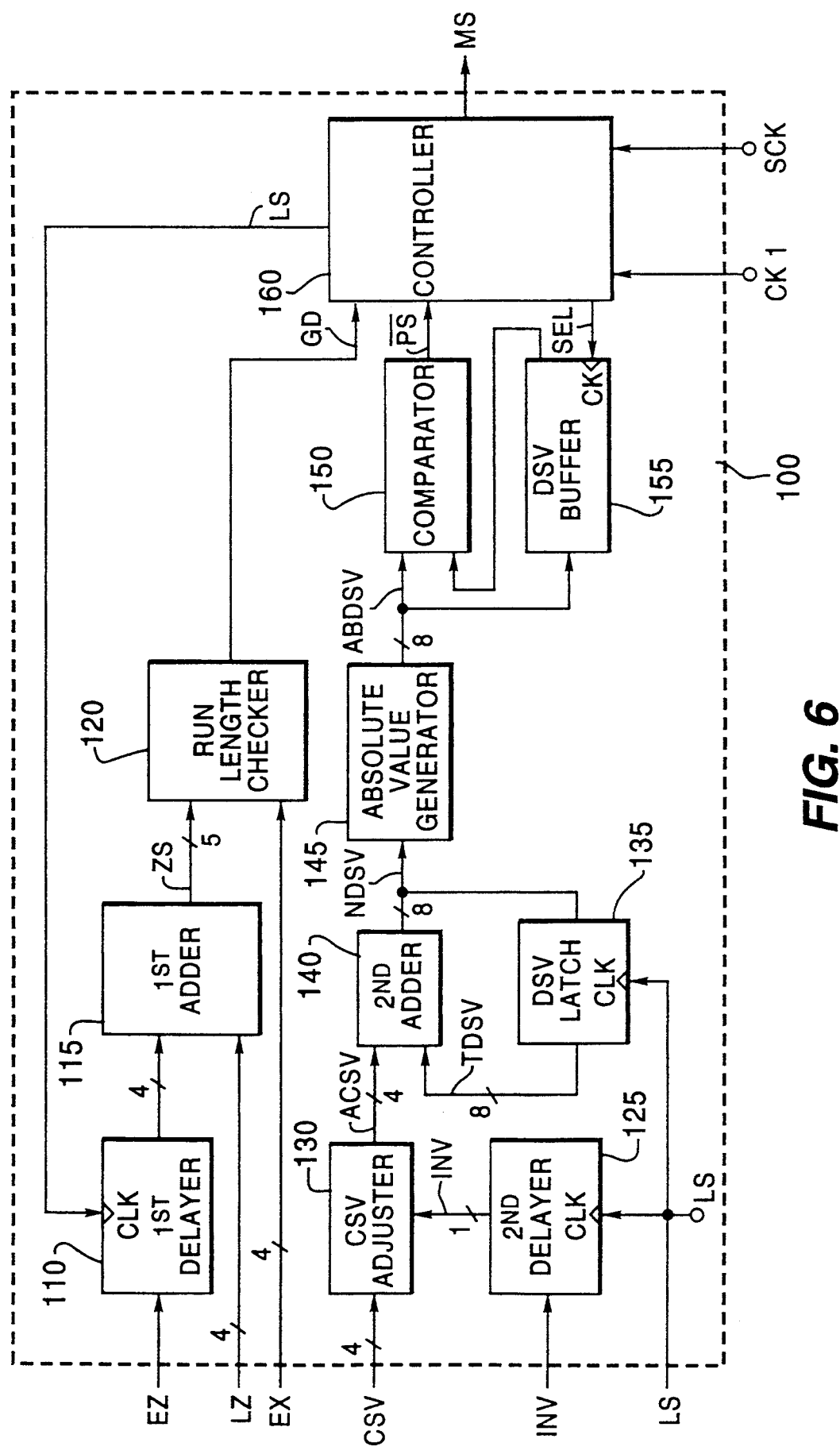
FIG. 6 is a block diagram of the merge bit generator shown in FIG. 3.

Referring to FIG. 6, in the merge bit generator 100, a block including the first delayer 110, the first adder 115, a run length checker 120, adds the end zero number EZ of the previous channel bit and the lead zero number LZ of the present merge channel bits, and generates good signal GD if the sum falls between 3T and 11T.

A block including the second delayes 125, a CSV adjuster 130, a DSV latch 135, the second adder 140 and a DSV absolute value generator 145, adjusts the CSV of the present merge channel bit according to the inverting bit INV to produce an adjusted CSV value ACSV, then adds it to the total DSV value TDSV up to the previous symbol to generate the new DSV value NDSV of the present symbol, and gets the absolute value ABDSV of the DSV value.

A block including a comparator 150 and a DSV buffer 155, compares the absolute DSV value ABDSV of the present symbol with the absolute value of previous DSV, then produces a pass signal PS only in case that the present absolute DSV is smaller.

A controller generates a selection signal SEL for storing the present DSV only when the good signal GD of the CSV memory 40 and the pass signal PS are simultaneously fed, and generates a final second address for selecting the merge bit satisfying an optimum DSV value.

Figure 7:
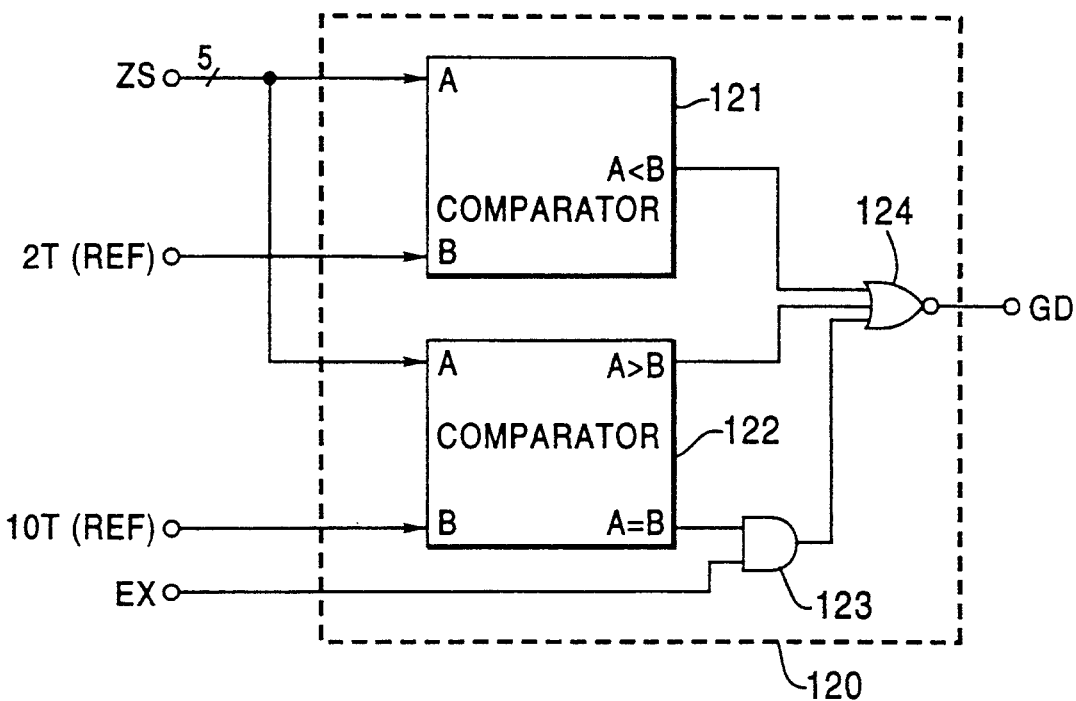
FIG. 7 is a circuit diagram of the run length check shown in FIG. 6.

In FIG. 7, the run length checker 120 consists of two comparators 121 and 122, and two gates 123 and 124. The comparators 121 and 122 receive the zero sum number ZS of the first adder 115 shown in FIG. 6, and respectively compare it with reference signals of 2T and 10T to check if the zero sum number 2S is in the range of 2-10. If the run length restriction is satisfied, they generates good signal GD of "HIGH". If the restriction is not fulfilled or an exception signal EX is fed in case of 10T, then the comparators generates a "LOW" signal as a fail signal.

Figure 8:
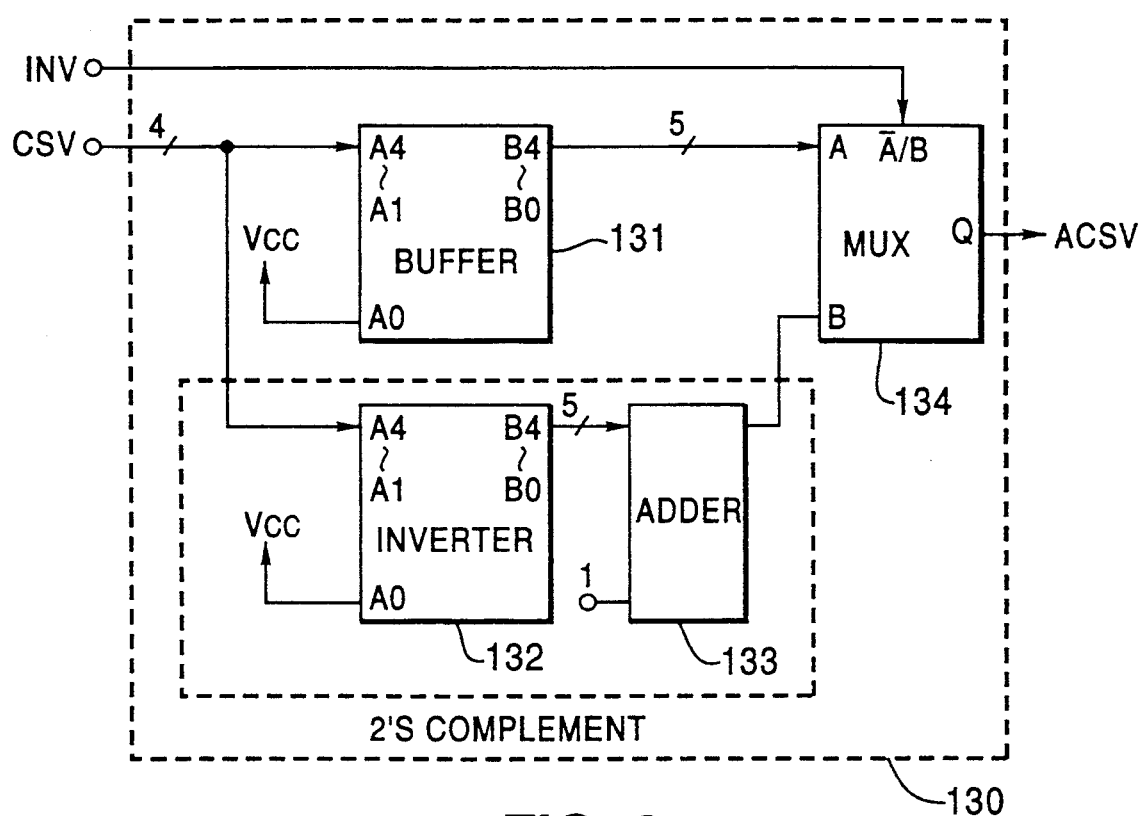
FIG. 8 ia a circuit diagram of the CSV adjustor shown in FIG. 6.

Referring to FIG. 8, the CSV adjuster 130 shown in FIG. 6, comprises a buffer 131, an inverter 132, an adder 133 and a multiplexer 134. The CSV adjuster 130 outputs the CSV signal from the CSV memory 130 after taking 2's complement when a "HIGH" inverting signal INV is fed, otherwise directly outputs the fed CSV signal.

Figure 9:
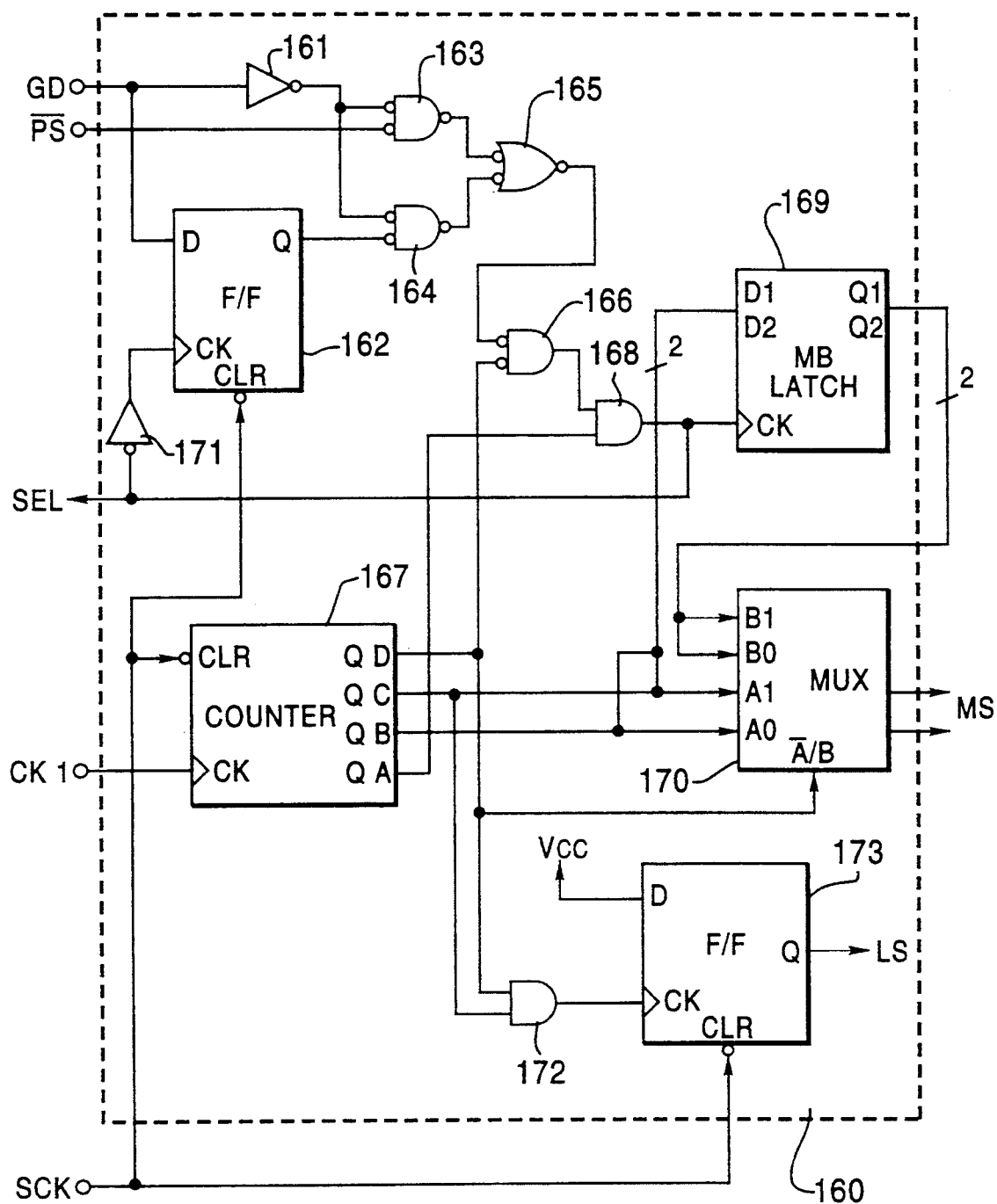
FIG. 9 is a circuit diagram of the controller shown in FIG. 6.

Referring to FIG. 9, the controller 160 comprises two flip-flops 162 and 173, a hexadecimal counter 167, a merge bit latch 169, a multiplexer 170, and a plurality of gates and inverters.

The controller 160, generates the selection signal SEL for storing the NDSV of the present merge bit upon receiving the good signal GD.

When an optimum DSV value is stored for four merge bits, the controller generates a merge selection signal MS for outputting the selected merge bit, and a selection signal LS for latching the DSV value to the DSV latch 135.

Figure 10:
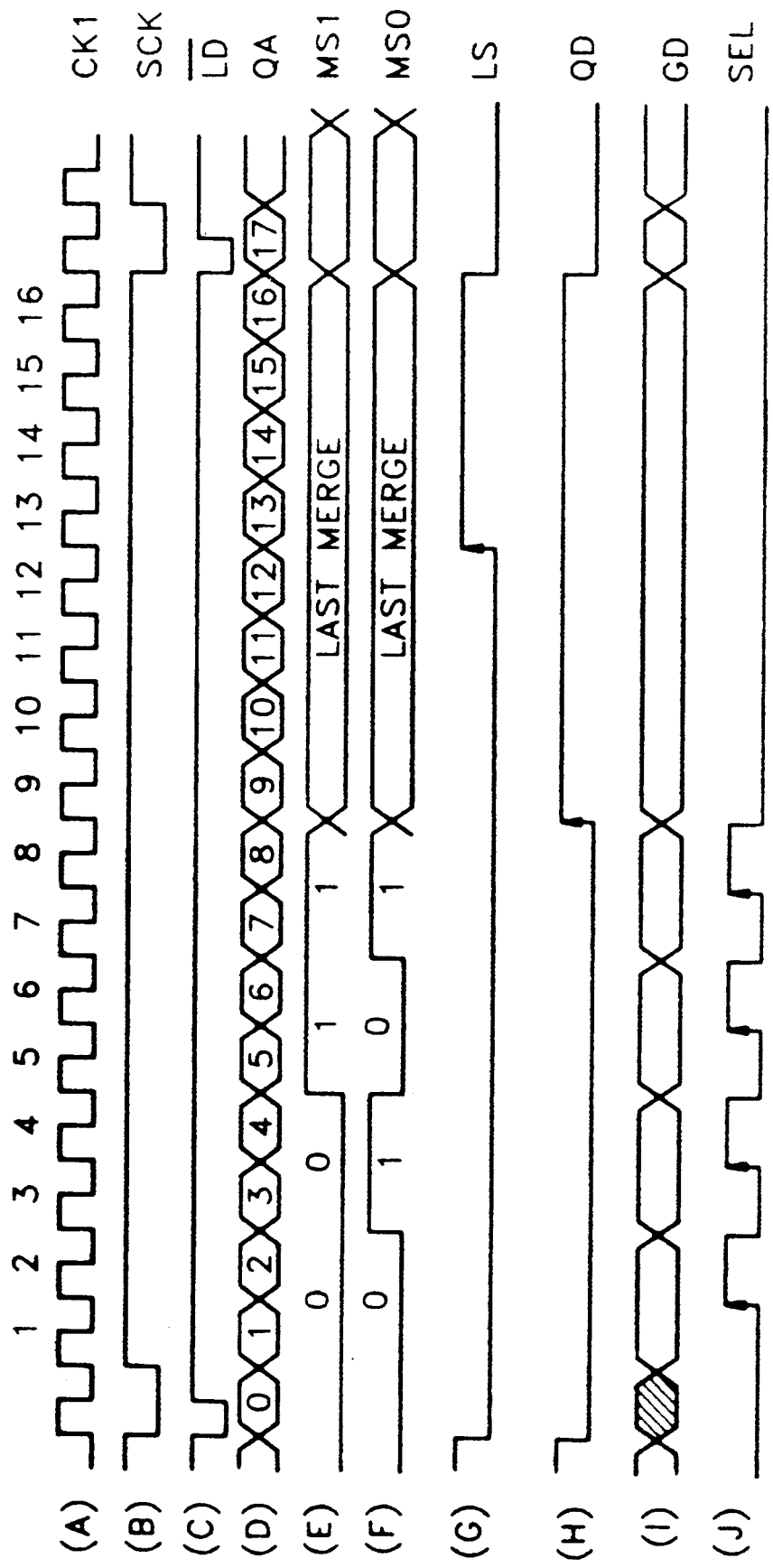
FIG. 10 is a waveform chart showing the operations of parts shown in FIG. 6.

FIG. 10 shows waveform for explaining operations of the parts shown in FIG. 6 to FIG. 9. It shows a number of control signals generated in a sequential steps of checking four merge bits for a channel bit, and checking DSV values of merge bits having proper run lengths, then selecting a merge bit corresponding to an optimum DSV value.

FIG. 11 is a flow chart for illustrating the operation of the modulation circuit according to the present invention.

In the drawing, there is shown a series of procedures for selecting merge bits having optimum DSV values for each symbol.

With reference to FIG. 3 to FIG. 10, it will be described for the procedure for selecting a merge bit which satisfies run length restrictions and has an optimum DSV value after converting 8 bit data into a charmer bit signal of 14 bits.

Hereinafter, the term, merge channel bit refers to the 14 bit channel bit and the merge bit in whole.

8 bit digital data fed to the EFM modulation circuit is latched by a symbol clock (SCK) train as (B) of FIG. 10. For the data and parity symbols, the symbol clock SCK is generated every 17 bit period, in which 1 channel bit and merge bit of 3 bit is generated, based on the first clock CK1 as (A) of FIG. 10.

ON the contrary, it is generated every 27 bit period for the synchronization pattern symbol.

The data latched by the symbol clock SCK is fed to the code memory 30 and the CSV memory 40, respectively, as the first address threrof.

The CSV memory 30 generates the lead zero number LZ, the end zero number EZ, the code sum value CSV and the inverting bit INV for the symbol selected by the second address, the merge selection signal MS from the merge bit generator 100.

The merge bit generator 100 checks the run length after combining the merge bit selected by the merge selection signal MS with the present symbol.

If the run length restrictions between 3T and 11T is satisfied, the generator compares the present DSV value with the DSV value formed by the previous merge bit, then replaces the DSV value with a nearer value to "0" to select a merge bit having a DSV value nearest to "0".

As described above, the merge bit generator 100 checks four merge bits for one channel bit, and generates the selection signal MS for selecting the merge bit MB making the sum of the corresponding CSV and the DSV up to the previous merge channel bit nearest to "0".

When the final merge bit selection signal is fed, the CSV memory 40 produces the merge bit for the present channel bit. Then the timing controller 60 feeds the load signal LD at the divided point of the second clock CK2 of 7.35 KHz by 17, that is, the end of the symbol.

Upon receiving the load signal LD, the PISO converter 70 parallelly loads the merge bit MB from the CSV memory 40 to the upper bit, and the channel bit CB to the lower bit, then converts them into serial output of 17 bits by the first clock CK1 OF 4.3218 MHz from the clock generator 50.

Then the NRZI converter 80 converts the serial data into Non-Return-to-Zero-and-Inverting waveform, and outputs it as a final EFM modulated signal, that is, a pit record signal train as (A) or (B) in FIG. 5. When the timing controller 60 generates the synchronization signal SYNC, "256" is fed to the code memory 30 and the CSV memory 40 as the respective first addresses thereof, the 24-bit channel bit data of the signal SYNC is converted into the 27-bit EFM signal.

When the block synchronization signal BL SYNC is generated every 98 frames, "257" or "258", for example, is fed as the first address, and converted into the 17-bit EFM signal.

Figure 11A:
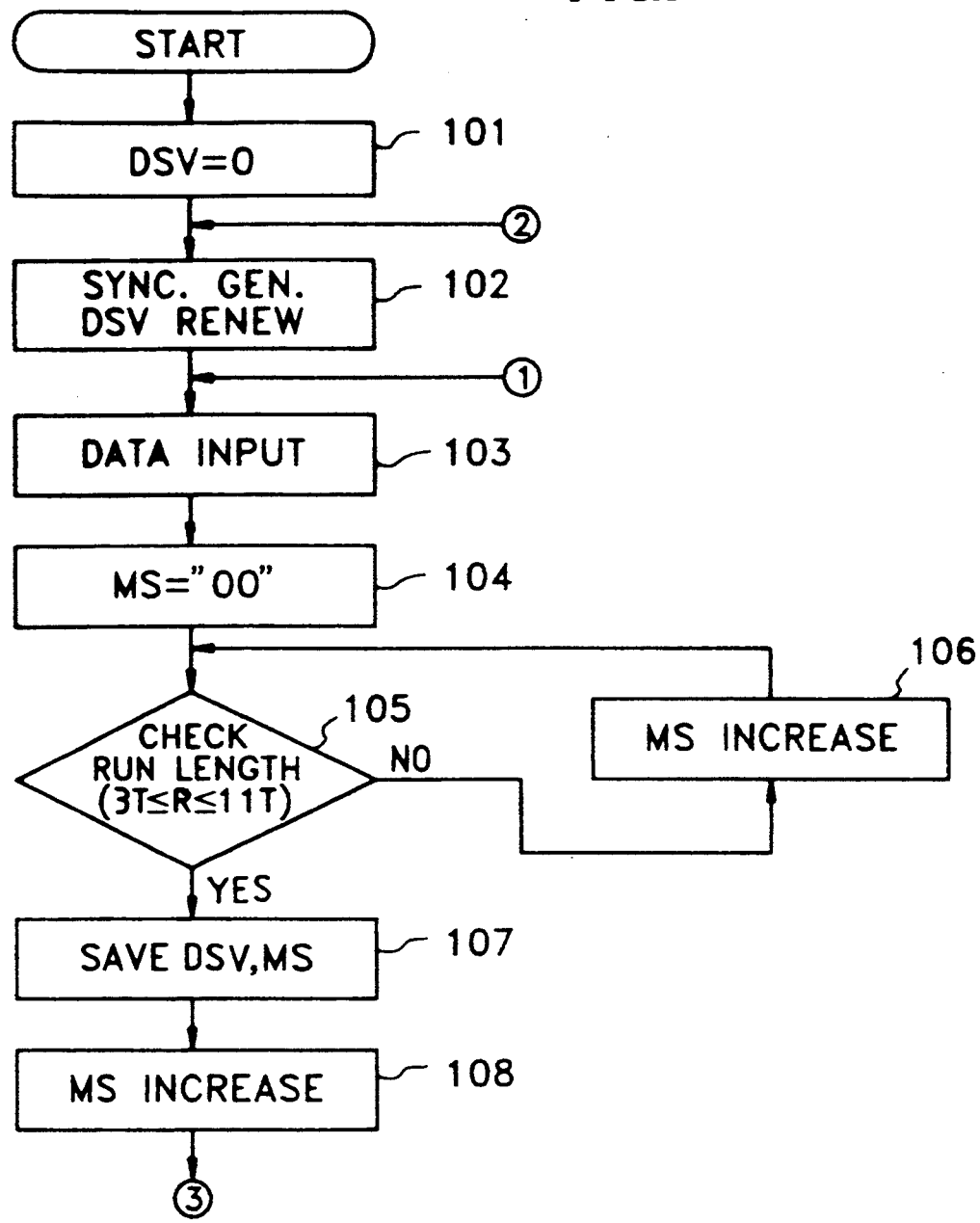
FIG. 11A and 11B are flow charts showing the operation of the circuit according to the present invention, drawings are divided into A and B only for drawing convenience.
Figure 11B:
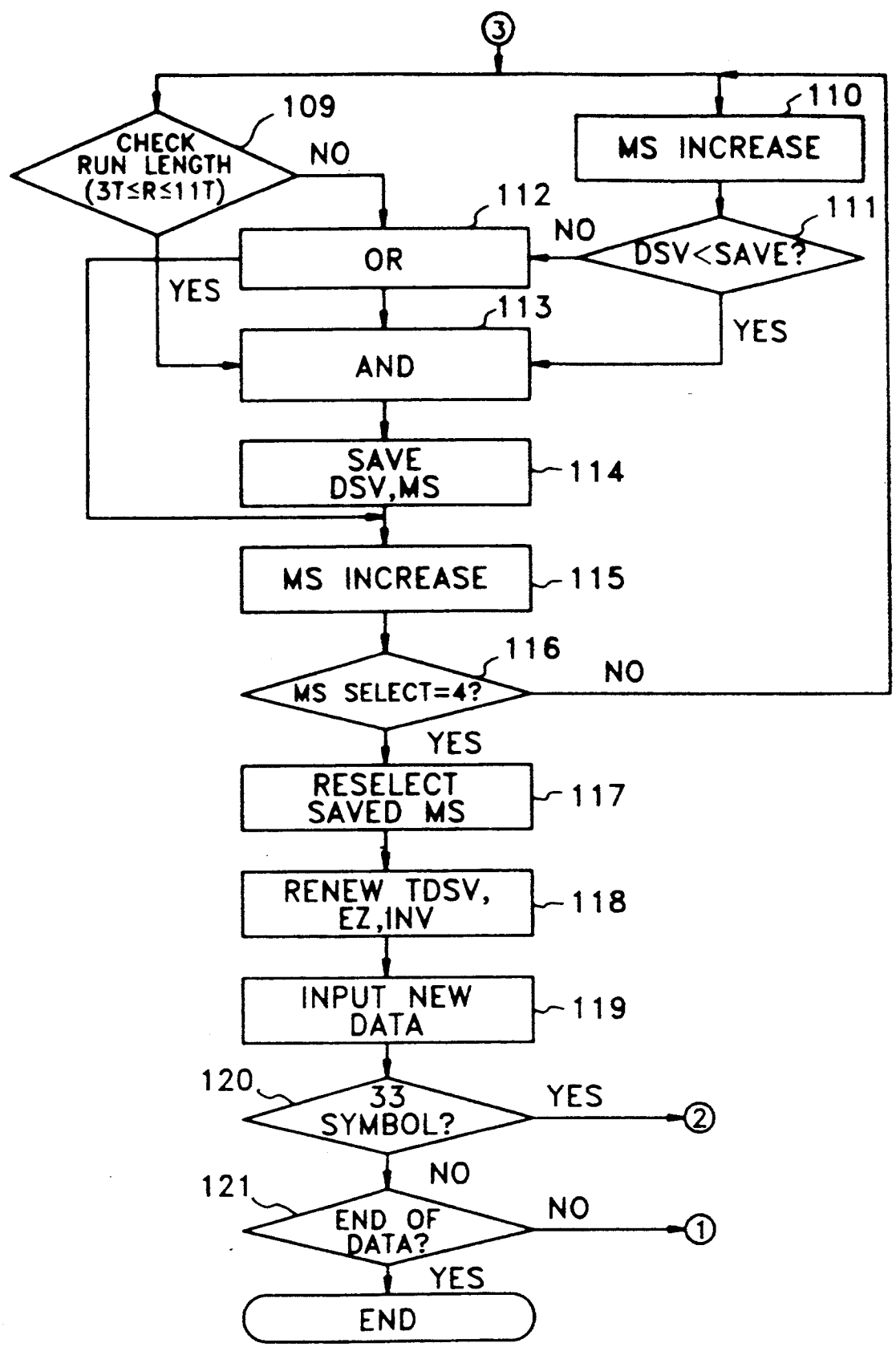

Now, the formation procedures of the EFM modulated signal having the merge bit MB of 3-bits and the channel bit CB of 14-bits and being converted from the 8-bit data, will be described in detail with reference to FIG. 11A and FIG. 11B.

When the system is initialized, DSV becomes "0" in step 101.

After that, a 24 bit synchronization pattern is generated for informing the initiation of 1 frame data in step 102. Namely, when the timing controller 60 shown in FIG. 3 generates the synchronization signal SYNC, the code memory 30 produces the synchronization pattern of 24 bits, and at the same time, the CSV memory 40 generates the merge bit MB to renew the DSV value according to the selection of the merge bit generator 100.

Then, 8-bit data is inputted through the data latch 20 shown in FIG. 3 at the leading edge of the symbol clock SCK as (B) in FIG. 10, and it is fed the code memory 30 and the CSV memory 40 as the first address to select the corresponding 14-bit channel bit CB in step 103. Accordingly, the code memory produces the 14 bit channel bit CB corresponding to the 8-bit data input.

As the counter 167 and the flip-flop 162 shown in FIG. 9 is reset by the symbol clock SCK of "LOW", the output of the counter 167 becomes "0000". Thus the output QD is also "LOW" and the multiplexer outputs the merge selection signal MS of "00" received through the input terminal A from the outputs QB, QC in step 104, then the CVS memory 40 shown in FIG. 3 attaches the merge bit MB selected by the merge selection signal MS to the channel bit fed from the code memory 30, and reads the lead zero number LZ, the end zero number EZ, CSV and inverting bit INV from the corresponding register as shown in FIG. 4, then feeds them to the merge bit generator 100.

The merge bit generator 100 checks whether the run length (R) restrictions (3T≦R≦11T) is satisfied by combining the selected merge bit to the present channel bit at step 105. More detailedly, the first delays 110 of FIG. 6 is used for storing the end zero number EZ of the previous merge channel bit delayed by one symbol period and selected by the final selection signal LS as (G) of FIG. 10. Then, the first adder 115 adds the end zero number EZ of the previous merge channel bit from the first delayer 110 to the lead zero number LZ of the present merge channel bit including the merge bit MB from the CSV memory 40, to get the zero sum ZS, and feeds it to the run length checker 120.

Then, the comparator 121 compares the zero sum ZS with the 2T signal to discriminate that the zero sum ZS is larger than 2T, that is, above 3T. And the comparator 122 checks if the zero sum ZS is smaller than 10T. When the zero sum ZS is 10, for example, then the run length becomes 11T through the NRZI conversion as (A),(B) of FIG. 5. Meanwhile, an exception signal EX is also stored in the code memory (30) in addition to the channel bit. For example, the exception signal is stored at "89"(10000000000100), "124"(01000000000010), and "257"(00100000000001).

IF the zero sum ZS of the symbol having the exception signal is 10, then the symbol has the signal pattern similar to that of the synchronization pattern. To prevent it, the AND gate 123 generates "HIGH" signal when the zero sum ZS is "10" for data "89", "124", "257" having the exception signals Ex. When all three inputs of the NOR gate 124 is "LOW", that is, the run length falls between 3T and 11T and the exception signal EX is not fed though the zero sum 25 is "10", the gate 124 produces the good signal GD in "HIGH", otherwise produces "LOW" as the fall signal. The good signal GD is fed to the controller 160 shown in FIG. 9. If the fed signal is "LOW", it will be inverted to "HIGH" by the inverter 161 and fed to the AND gates 163, 164, then the gates do not feed the clock to the merge bit latch 169 which temporally stores the merge bit MB.

In step 106, the counter 167 counts the first clock CK1 as (A) of FIG. 10, and produces "01" through the terminals QC, QB, then the merge setection signal MS is generated for selecting merge bit MB of "001".

On the contrary, if the good signal GD of "HIGH" is generated in step 105, the signal is inverted to "LOW" by the inverter 161 and fed to the AND gates 163, 164.

If the good signal GD is firstly generated, the flip-flop 162 is in the clear or initial state, and the flip-flop is feeding "LOW" signal to the AND gate 164. The OR gate 165 is accordingly generating "LOW" signal. The AND gate 166 which is fed the "LOW" signal of the gate 165, produces "HIGH" signal as the output from the terminal QD is "LOW", and the AND gate 168 generates the DSV selection signal SEL as (J) in FIG. 10 according to the output of the terminal QA of the counter 167. Then, in step 107, the merge bit latch 169 stores the present merge selection signal MS fed by the output terminals QC, QD of the counter 167, according to the output of the AND gate 168.

At the same time, the DSV buffer 155 shown in FIG. 6 stores DSV value fed from the DSV absolute value generator 145 by the DSV selection signal SEL.

In more detail, for the DSV operation procedures, the CSV adjuster 130 adjusts the CSV value from the CSV memory 40 according to the inverting bit signal INV fed through the second delayer 125.

The second delayer 125 delays the previous inverting bit INV by 1 symbol period by the final merge bit selection signal LS as (G) of FIG. 10, and is toggled by the successing inverting bit INV.

If the inverting bit INV of the merge channel bit is "HIGH", for example, the present output of the second delayer 125 is toggled in response to the final merge bit selection signal.

Then the CSV adjuster 130 shown in FIG. 8 feeds the input CSV to the buffer 131 and the inverter 132. Here, the DSV data has been stored in the CSV memory 40 after being complementally converted to 5-bit, thus it should be restored to 5 bit on reading. To achieve it, the buffer (131) and the inverter 132 attaches "1" to the end of the CSV data to convert it from 4 bit to 5 bit signal.

If the original CSV value is "7", for example, "0011" is stored in the CSV memory 40 after 2's complemental conversion thereof, that is $(7-1)/2$, and when the data is fed to the buffer 131, "1" is attached to the end of "0011" to become "00111", namely "7".

Meanwhile, the block including the inverter 132 and the adder 133 inverts the present merge channel bit to enable to be coupled with the previous bit or, receiving the inverting bit INV of "1" from the second delayer 125.

That is, the block executes taking of the 2's complement according to the logical result, "HIGH" or "LOW", of the previous symbol.

The complemental conversion is executed by the inverter 132 and the adder 133, the conversion is performed as follows.

After attaching "1" to the end of the input CSV, the signal is inverted, then 1 is added to the inverted signal.

As the result, the multiplexer 134 selectively outputs the CSV or the complement of the CSV depending on the inverting bit INV of the previous symbol.

The adjusted CSV ACSV from the CSV adjuster 130 is fed to the second adder 140.

Meanwhile, the DSV latch 135 stores the cumulative total TDSV of the DSV up to the previous channel bits before counting the CSV for the present merge channel bit.

The second adder 140 counts the sum of the adjusted CSV ACSV and the total DSV value TDSV to generate the new DSV NDSV. Then, the DSV absolute value generator 145 takes the absolute value ABDSV from the new DSV NDSV, and feeds it to the comparator 150. After that, the comparator 150 compares the absolute DSV value ABDSV with the previous DSV value PDSV from the DSV buffer 155, and generates a pass signal $\overline{PS}$ when the absolute value of the present DSV is smaller than that of the previous DSV. In more detail, the controller 160 generates the DSV selection signal SEL if the run length restrictions are fulfilled on generating the first absolute DSV value ABDSV for the merge channel bit. Then the absolute DSV value ABDSV is stored in the DSV buffer 155 as the previous DSV value PDSV, and the output of the comparator 150 becomes "HIGH".

When the merge selection signal MS for selecting the next merge bit is generated, the absolute DSV value ABDSV for the next, that is, the present merge bit is compared with the previous DSV value PDSV stored in the DSV buffer 155, by the comparator 150.

After storing the DSV value in the DSV buffer in step 107, the counter 167 generates the selection signal MS for selecting the next merge bit in step 108. Upon receiving the selection signal MS, the CSV memory generates the various informations EZ,LZ,CSV,INV for the next merge bit.

At this time, the DSV value of the present merge channel bit including the merge bit is already stored in the DSV buffer 155, thus the run length check and the DSV counting for the present merge channel bit is simultaneously accomplished in steps 109, 110 and 111.

In more detail, the first adder 115 adds together the end zero number EZ of the previous merge channel bit and the lead zero number LZ of the present merge channel bit to determine the zero sum ZS of the two merge channel bits, then the run length checker 120 checks whether the run length of the symbol falls within the restriction, from 3T to 11T. Meanwhile, the CSV value is adjusted by the CSV adjuster 130, and added to the total DSV value up to the previous merge channel bit by the second adder 140. Then it is converted into absolute value ABDSV by the DSV absolute value generator 145, and compared with the previous DSV value PDSV.

If the run length restriction is satisfied, the run length checker 120 generates the good signal GD of "HIGH" in step 109.

And, if the absolute DSV value ABDSV is smaller than the previous DSV value PDSV, the comparator 150 generates the According to these two signals GD, $\overline{PS}$, the controller 160 temporally stores the merge bit selection signal MS, and generates the pass signal DSV selection signal SEL.

When the first DSV selection signal SEL, which satisfies the run length restriction, is generated, the flip-flop 162 shown in FIG. 9 produces "HIGH" signal, and maintains the "HIGH" state until the next symbol clock SCK is generated.

Therefore, the DSV selection signal SEL is not generated without simultaneous inputs of the good signal GD and the pass signal $\overline{PS}$. On the contrary, if these two signals are simultaneously generated, the selection signal is generated to store the merge bit selection signal MS in the merge bit latch 169, and the absolute DSV value ABDSV in the DSV buffer shown in FIG. 6.

As described above, if the good and pass signals GD, $\overline{PS}$ are simultaneously generated in step 113, then the present absolute DSV value ABDSV is stored in the DSV buffer 155 in step 114. And the counter 167 increases the outputs of the terminals QC, QD by one, thus generates the next merge bit selection signal MS. On the contrary, any one of the good and pass signals GD, $\overline{PS}$ is not generated not to produce the DSV selection signal SEC in step 112. In that case, the counter 167 only increases the merge selection signal MS by one.

Executing the above described procedures repeatedly, the controller 160 checks whether four merge selection signals MS are all generated in step 116. If the four merge selection signals MS are all generated, the output of the terminal QD of the counter 167 is changed to "HIGH" as (H) in FIG. 10.

Upon receiving the "HIGH" output of the terminal QD, the multiplexer 170 selects the input terminal B, and selects to produce the merge bit selection signal MS stored in the merge bit latch 169. Then the CSV memory 40 generates the lead zero number LZ, the end zero number EZ, CSV value and the inverting bit INV for the selected merge bit. Upon receiving the informations, the run length checker 120 generates the good signal GD or the fail signal, at the same time, the CSV value is converted to adjusted CSV by the CSV adjuster 130 and then added to the total DSV by the second adder 140 to form a new DSV value NDSV for the present merge channel bit. When the terminal QD is "HIGH", the transition of the terminal QC to "HIGH" make the AND gate 172 generate a "HIGH" signal and the flip-flop 173, in turn, is changed to "HIGH" to produce the final merge selection signal LS as (G) in FIG. 10.

Upon receiving the final merge selection signal LS, the DSV latch 135 shown in FIG. 6 stores the new DSV value NDSV fed from the second adder 140 as a total DSV value TDSV in step 118. And the first delayer 110 stores the end zero number EZ of the present merge channel bit for one symbol period, and the second delayer 125 delays the inverting bit signal INV for one symbol period, too. If the inverting bit INV is "1", the output of the second delayer 125 is toggled.

When the informations TDSV, EZ and INV are renewed, the code memory 30 is producing the 14-bit channel bit CB for the 8-bit input data, and the CVS memory 40 is producing finally selected merge bit MB. If the load signal LD as (C) in FIG. 10 is fed from the timing controller 60, the PISO parallelly converter loads the merge bit MB of the CSV memory 40 as the upper bit, and the channel bit CB of the code memory 30 as the lower bit, then serially outputs according to the first clock CK1. Then, the NRZI converter 80 converts the serial symbol data to NRZI waveform to generate the pit record signal. As shown in FIG. 10, the merge bit for the present channel bit is determined by checking the run length and the DSV value with reference to the previous symbol in the EFM modulating procedure.

In step 119, the new 8-bit data is fed by the symbol clock. Then, it is checked whether the data is the final one of the frame in step 120. If the data is not the final data, then is checked whether the end of the data. If it is not the end of the data, there remains the data to be processed in the frame. Therefore, the procedure returns to step 103 and the steps for determining the merge bit MB appropriate for the present merge bit, are repeated.

On the contrary, if the end of frame is detected in step 120, then returns to step 102 and receives the synchronization pattern of the next frame.

The above described procedures will now be detailedly described with some specific examples, the 8-bit input data is assumed to be "0"→"7"→"12" in order. For example, the channel bits for the "0", "7" and "12" is as shown in (A) of FIG. 12. In the drawings, the end zero number EZ is "5", the CSV value "4", inverting bit "4" for the data "1". The csv value corresponds to the difference between the "HIGH" and "LOW" bits of the NRZI waveform as (E) in FIG. 12. As the "HIGH" bit is 9T and "LOW" bit 5T, the CSV value becomes "4". And the inverting bit INV is "1" as the end of the NRZI wave is "HIGH".

When the data "0" is coupled to the data "7", the run length and the DSV value are checked for four merge bits "000", "001", "010" and "100". Before the input of the data "7", the DSV latch 135 is storing "4", the DSV value for the data "0", the first delayer 110 the end zero number "5", the second delayer 125 the inverting bit INV "1".

Under the circumstances, if the data "7" is fed through the data latch 20, the terminals QC, QB of the counter 167 geerates the merge selection signal MS in "00". Then, the code memory 30 produces the channel bit "00100100000000" for the data "7". At the same time, the CSV memory 40 produces merge bit of "000", the lead zero number LZ1 of "5", the end zero number EZ of "8", the CSV value CSV1 of "−11" and the inverting signal INV of "0". While the first delayer 110 produces "5" as the end zero number EZ, and the second delayer 125 produces "1" as the inverting signal respectively for the previous symbol.

Therefore, the first adder 115 adds the lead zero number LZ1 "5" for the present symbol to the end zero number EZ "5" fed from the first delayer 110 of the previous symbol, to generate the zero sum "10". As the zero sum satisfies the run length restriction and does not accompanies the exception signal EX, the run length checker 120 generates the good signal GD in "HIGH". Upon receiving the good signal, the AND gate 164 and the OR gate 165 shown in FIG. 9 respectively produce "LOW" signals.

As the first run length has been discriminated as good, the AND gate 168 feeds the clock to the merge bit latch 169 and generates the DSV selection signal SEL by the output QA of the counter 167.

Accordingly, the merge bit latch 169 stores the merge selection signal MS as "00", and the DSV buffer 155 stores the absolute DSV value ABDSV fed from the DSV absolute value generator 145.

As the INV=1, the $CSV_1=-11$ is complementally converted to $ACSV_1=11$, then is added to the TDSV=4 stored in the DSV latch 135 to become DSV=15 by the second adder 140. After that, the counter 167 generator "01" through the terminals QC,QB, then the CSV memory 40 generates $LZ_2=2$, $CSV_2=7$, EX=8, INV=1. Accordingly, the first adder 115 produces the zero sum ZS=7, and the run length checker 120 produces the good signal GD in "HIGH".

Meanwhile, CSV$_2$=7 is converted to ACSV$_2$=−7 by the CSV adjuster 130, and the second adder 140 generates NDSV=−3. Then, the DSV absolute value generator 145 feeds the absolute DSV value ABDSV to the comparator 150. As the DSV buffer is storing the DSV=15 for the previous symbol, the comparator 150 generates the pass signal $\overline{PS}$ in "LOW", The AND gate 163 shown in FIG. 9, accordingly generates the "LOW" signal, the merge bit latch 169, in turn, stores the outputs QC,QB of "01" and the DSV buffer 155 stores the DSV value of "3". If the counter 167 generates "10", the CSV memory 40 produces MB=010, EZ3=8, LZ3=1, CSV3=9, INV=1.

Then, the first adder 115 produces ZS=6, and the run length checker 120 generates the good signal GD in "HIGH". The CSV$_3$=9 is converted to ACSV$_3$=−9 by the CSV adjuster 130, and the second adder 140 generates DSV$_3$=−5. After that, the comparator 150 compares the DSV$_3$=5 with the PDSV=3 to generates the pass signal $\overline{PS}$ in "HIGH". As the merge selection signal SEL is not generated, the DSV=3 in the DSV buffer 155 is maintained without change.

When the counter 167 produces "11", the CSV memory 40 generates MB=100, LZ$_4$=0, CSV$_4$=11, EZ=8, INV=1. Meanwhile, the first adder 115 produces ZS=5, the run length checker 120 accordingly generates the good signal GD in "HIGH". At the same time, the CSV adjuster 130 converts CSV$_4$=11 to ACSV$_4$32 −11, then the second adder 140 adds the ACSV$_4$=−11 and TDSV=4 to produce DSV$_4$=−7. As the absolute value of the DSV$_4$=−7 is also larger than that of DSV$_2$=−3, the comparator 150 generates the pass signal $\overline{PS}$ in "HIGH".

When the checking for four merge bits "000", "001", "010", "100" is accomplished, the merge selection signal MS of "01" corresponding to the merge bit "001" is stored in the merge bit latch 169. If the output QD of the counter 167 is changed to "HIGH", the multiplexer 170 selects the output "01" of the merge bit latch 169, and the CSV memory 40 again generates MB=001, LZ$_2$=2, CSV$_2$=7, EZ=8 and INV=1.

When the final selection signal LS is generated, the first delayer 110 stores EZ=8, and the second delayer 125 receives the INV=1 to be toggled and to generate INV=0.

And the DSV latch 135 stores TDSV=−3.

After that, when the load signal LD is generated, the PISO converter 70 parallelly loads the MB="001" to the upper bit, and the CB=00100100000000 to the lower bit, then serially outputs them as (E) in FIG. 12 by the first clock CK1. And the NRZI converter 80 converts the serial data train into the NRZI waveform as (F) in FIG. 12 to generate the pit record signal train.

As described above, the present invention provides an EFM modulating circuit having very simple structure. The circuit is able to select an appropriate merge bit satisfying the run length restriction and other requirements using the lead zero number of the present symbol and the end zero number of the previous symbol. Moreover, the circuit simultaneously counts the digital sum value with the checking of the run length, thereby selecting the merge bit rapidly and correctly.

What is claimed is:

1. An eight-to-fourteen modulation circuit of a digital audio system for converting 8-bit symbol data to 14-bit channel data and producing an EFM signal, said circuit comprising:
    first memory means for storing and providing said channel data;
    second memory means for storing and providing information in a plurality of registers, each of said plurality of registers having said information for a data string formed by combining said channel data and merge bits, said information comprising said merge bits, a number of leading zeros of said data string, a number of ending zeros of said data string, a code sum value of said data string, and an inverting bit;
    merge bit generator means for producing a merge selection signal in response to an exception signal from said first memory means,
    said information of said plurality of registers from said second memory means, and
    simultaneously generating a present digital sum value of said code sum value and a run length of the data string,
    said merge selection signal being provided to said second memory means for selecting optimum said merge bits, said optimum merge bits being combined with said channel data fulfilling a predetermined run length restriction of said run length and minimizing a direct current component of said EFM signal;
    parallel-in serial-out converter means for loading said channel data from said second memory means as lower bits and for loading said optimum merge bits from said second memory means as upper bits, and for serially providing said combined channel data and said optimum merge bits; and
    non-return-to-zero and inverting converter means for converting an output of said parallel-in serial-out converter means to the EFM signal being a pit record signal train.

2. The circuit according to claim 1, wherein said merge bit generator means comprises:
    run length checker means for producing said run length by adding said number of leading zeros of said data string comprising said channel data being present merge channel data and said number of end zeros of said data string comprising said channel data being previous merge channel data, and for checking whether said run length fulfills said predetermined run length restriction;
    means for generating a present total value of said present merge channel data by adding an accumulative said code sum value up to said previous merge channel data and said code sum value of said present merge channel data;
    means for replacing said present total value with a smallest of compared values by storing said present total value and providing said compared values by sequentially comparing said stored present total value with accumulative values corresponding to other said merge bits; and
    means for controlling said run length checker means, said means for generating and said means for replacing, and for sending a final merge selection signal to said run length checker means and said means for generating upon completion of the comparing and replacing in said means for replacing.

3. An eight-to-fourteen modulation circuit in a digital audio system for converting 8-bit symbol data to 14-bit channel data and producing an EFM signal, said circuit comprising:

first memory means for providing said channel data in response to said symbol data;

second memory means for providing merge bits, a code sum value, an inverting bit, a lead zero number and an end zero number in response to said channel data, a synchronizing signal and a merge selection signal;

merge bit generator means for generating said merge selection signal by simultaneously determining a run length and a present digital sum value, in response to said code sum value, said inverting bit, said lead zero number and said end zero number, said merge selection signal being indicative of optimum said merge bits satisfying a predetermined run length restriction, and said merge selection signal minimizing a direct current component of said EFM signal;

first converter means for serially generating first converted data when said merge selection signal is indicative of said optimum merge bits, in response to receiving in parallel said channel data as lower bits and said merge bits as upper bits; and second converter means for providing said EFM signal as a pit record signal train by converting said first converted data.

4. The eight-to-fourteen modulation circuit according to claim 3, wherein said merge bit generator means comprises:

run length checker means for providing a run check signal when said run length satisfies said predetermined run length restriction in response to a zero sum and a predetermined exception signal, said zero sum being produced by adding the end zero number of a previous merge channel data and the lead zero number of a present merge channel data;

digital sum value calculator means for determining the present digital sum value of present merge channel data by adding an adjusted said code sum value of said present merge channel data and a previous digital sum value of previous merge channel data;

comparator means for generating a pass signal if said present digital sum value is less than said previous digital sum value of said previous merge channel data by comparing the present digital sum value and said previous digital sum value; and controller means for generating said merge selection signal indicative of said optimum merge bits in response to said run check signal and said pass signal.

5. The eight-to-fourteen modulation circuit according to claim 4, wherein said run length checker means comprises:

means for storing the end zero number of the previous merge channel data in response to a final merge selection signal generated in said controller means;

adder means for providing the zero sum by adding said end zero number of said previous merge channel data and the lead zero number of the present merge channel bit data; and comparator means for generating said run check signal when said zero sum has satisfied said predetermined run length restriction by comparing said zero sum to a reference value of the predetermined run length restriction.

6. The eight-to-fourteen modulation circuit according to claim 4, wherein said digital sum value calculator means comprises:

means for delaying said inverting bit of the previous merge channel data;

code sum value adjuster means for providing said adjusted code sum value in response to the code sum value and said delayed inverting bit;

adder means for providing said present digital sum value of the present merge channel data by adding said adjusted code sum value and a total digital sum value; and digital sum value latch means for storing said present digital sum value and providing said stored present digital sum value as said total digital sum value in response to said final merge selection signal.

7. The eight-to-fourteen modulation circuit according to claim 6, wherein said code sum value adjuster means comprises:

buffer means for providing a first value in response to the code sum value of the present merge channel data;

converting means for providing a second value in response to 2's complemental converting said code sum value of the present merge channel data; and multiplexer means for providing said adjusted code sum value in response to said first value, said second value, and said inverting bit.

8. A method for generating an eight-to-fourteen modulated signal in a digital audio system, said method comprising the steps of:

providing 14-bit channel data in response to 8-bit symbol data;

producing a data string by combining said channel data and merge bits;

simultaneously checking a run length of the data string and determining a present digital sum value of a code sum value;

generating a merge selection signal in response to said merge bits, said code sum value, an inverting bit, a lead zero number of said data string and an end zero number of said data string, said merge selection signal being indicative of optimum said merge bits for satisfying a predetermined run length restriction of said run length, and said merge selection signal minimizing a direct current component of said EFM signal;

generating serial data in response to receiving in parallel both said channel data as lower bits and said merge bits as upper bits when said merge selection signal is indicative of said optimum merge bits; and converting said serial data into an EFM signal being a pit record train signal.

9. The method of claim 8, wherein said step of generating a merge selection signal further comprises the steps of:

providing a run check signal, when said predetermined run length restriction is met, in response to a zero sum determined by adding the end zero number of previous merge channel data and the lead zero number of present merge channel data;

determining the present digital sum value of the present merge channel data by adding the code sum value of said present merge channel data and a previous digital sum value of previous merge channel data;

generating a pass signal if said present digital sum value is less than said previous digital sum value by comparing the present digital sum value and said previous digital sum value; and simultaneously generating a digital sum value selection signal and said merge selection signal indicative of said optimum merge bits in response to said run check signal and said pass signal.

10. The method of claim 9, wherein said step of providing the run check signal further comprises the steps of:
   delaying the end zero number of the previous merge channel data; and
   comparing said zero sum to a reference value of the predetermined run length restriction for generating said run check signal when said zero sum has satisfied said predetermined run length restriction.

11. The method of claim 9, wherein said step of generating the present digital sum value further comprises the steps of:
   delaying said inverting bit of the previous merge channel data in response to a final merge selection signal;
   providing an adjusted code sum value in response to said code sum value and said inverting bit;
   providing the present digital sum value of the present merge channel data by adding said adjusted code sum value to a total digital sum value; and
   storing said present digital sum value and providing said stored present digital sum value as said total digital sum value.

12. The method of claim 11, wherein said step of providing the adjusted code sum value further comprises the steps of:
   providing a first value by buffering the code sum value of the present merge channel data;
   providing a second value by 2's complemental converting said code sum value; and
   providing said adjusted code sum value in response to said first value, said second value, and said inverting bit.

13. An eight-to-fourteen modulation circuit comprising:
   means for providing 14-bit channel data in response to 8-bit symbol data;
   means for providing optimum merge bits by simultaneously generating a run check signal corresponding to present said channel data when a run length determined by adding a lead number of zeros of said present channel data and an end number of zeros of previous said channel data satisfies a predetermined condition, and generating a present digital sum value in response to a code sum value of said present channel data; and
   means for producing an EFM signal being a pit record train signal by combining said present channel data with said optimum merge bits and converting said combination.

14. An eight-to-fourteen modulation method comprising the steps of:
   providing 14-bit channel data in response to 8-bit symbol data;
   providing optimum merge bits by simultaneously checking a run length of present said channel data against a predetermined condition by determining a sum when adding a lead number of zeros of said present channel data and an end number of zeros of previous said channel data and comparing the sum, and generating a present digital sum value in response to a code sum value of said present channel data; and
   producing an EFM signal being a pit record train signal by combining said present channel data with said optimum merge bits and converting said combination.

15. An eight-to-fourteen modulation circuit comprising:
   latching means for providing 8-bit symbol data in response to a symbol clock pulse;
   clock generating means for producing a first clock pulse and a second clock pulse;
   timing controller means for generating a first divided signal and a second divided signal in response to the first and the second clock pulses;
   code memory means for providing 14-bit channel data in response to a merge selection signal, a block synchronization signal and the 8-bit symbol data from the latching means;
   code sum value memory means for providing an inverting signal, a code sum value, a lead zero number, an end zero number and merge bits in response to said block synchronization signal, said 8-bit symbol data from the latching means, the first divided signal and a merge selection signal;
   means for generating said merge selection signal in response to said lead zero number, said end zero number, said code sum value, and said inverting signal, said merge selection signal being generated after simultaneously determining a run length satisfying a predetermined condition by adding said lead zero number of present said channel data and said end zero number of previous said channel data, and producing a present digital sum value in response to said code sum value of said present channel data;
   means for providing serial data by shifting a concatenation of said 14-bit channel data and said merge bits in response to said second divided signal and said first clock pulse; and
   means for providing an EFM signal being a pit record signal train by non-return-to-zero and inverting conversion of said serial data.

16. A method of an eight-to-fourteen modulation circuit, said method comprising the steps of:
   latching 8-bit symbol data in response to a symbol clock pulse;
   generating a first divided signal and a second divided signal in response to first and second clock pulses;
   providing 14-bit channel data in response to a merge selection signal, a block synchronization signal and the latched 8-bit symbol data;
   generating an inverting signal, a code sum value, a lead zero number, an end zero number and merge bits in response to said block synchronization signal, said latched 8-bit symbol data, the first divided signal and a merge selection signal;
   producing said merge selection signal in response to said lead zero number, said end zero number, said code sum value, and said inverting signal, said merge selection signal being produced after simultaneously determining a run length satisfying a predetermined condition by adding said lead zero number of present said channel data and said end zero number of previous said channel data, and producing a present digital sum value in response to said code sum value of said present channel data;
   providing serial data by shifting a concatenation of said 14-bit channel data and said merge bits in response to said second divided signal and said first clock pulse; and
   providing an EFM signal being a pit record signal train by non-return-to-zero and inverting conversion of said serial data.

* * * * *